UNITED STATES PATENT OFFICE.

EDOUARD DEUTSCH, OF HAVRE, FRANCE.

IMPROVEMENT IN WATER-PROOF CEMENTS, &c.

Specification forming part of Letters Patent No. 3,598, dated May 25, 1844.

*To all whom it may concern:*

Be it known that I, EDOUARD DEUTSCH, of the Kingdom of France, residing in the city and port of Havre, have invented a new composition of matter and improvement in the preparation and combination of materials not known or used before my discovery thereof, and not, as I believe, now in use or for sale in the United States, certainly not with my consent or allowance, yielding a production which will be found of general utility in its various modes of combination, among others as a cement or pigment, supplying the means of preventing the oxidation or deterioration of metallic substances, and of precluding the infiltration or percolation of fluids and the absorption of dampness or moisture, preserving from the injurious effects thereof, and even in some cases guarding against destruction by fire, which can be used with great advantage and economy, especially in all things that are wanted to be made water-tight in all edifices and constructions in which stone, wood, timber, earth, or metals are employed, for vessels, steamers, steam and other engines, cordage, various tissues and textures, leather, and in general for materials used in various arts and manufactures.

In order to enable persons skilled in the arts to make and use my invention, I will proceed to describe the materials employed therein, the mode and process of its composition, and its application.

The basis consists in all substances that are combustible and not metallic compounds—such as bitumen, asphaltum, pisasphalt, maltha, mineral caoutchouc, and products obtained from the distillation of fossil coal.

Formula 1. Of the substances above described as bases, particularly bitumen, put any given quantity into the boiler of a still prepared for the purpose, lute the apparatus, and heat it in such manner that the essential oil and water embodied in the bitumen shall, during the process of evaporation, be condensed by the cold water contained in the condenser or cooler of the worm, and at that point when the distillation produces only a few drops of liquid sift the material which remains in the boiler through metallic cloth or sieves placed over a vessel of sufficient capacity and containing water enough to prevent adhesion to the bottom or sides. When it has been reduced to a temperature equal to 50° or 60° centigrade—say 122° to 140° Fahrenheit—take the material out of the water and mold it into lumps.

Formula 2. To the material prepared as per Formula No. 1 add from one to twenty-five per cent. of protoxide of lead or of any other oxide, and you will obtain a substance more or less infusible, according to the proportion of oxide which may have been used and fuse together.

Formula 3. To the material prepared as per Formula No. 1 add from one to one hundred per cent. or more of greasy adipose matter, and you will obtain a product more or less fusible in proportion to the greater or less quantity of adipose matter used.

Formula 4. To the material prepared as per Formula No. 1 add from one to one hundred per cent. of siccative oil, particularly of linseed, and as much caoutchouc or gum-elastic or mucilage, and you will obtain a paint or pigment peculiarly adapted to various textures, tissues, cloths, paper, &c., as leaving them perfectly flexible.

Formula 5. To make black varnish of great beauty you must, after heating the bitumen until it has become liquid, sift it through very fine metallic sieves previously heated, and then add from one to one hundred per cent. of resin, or of resinous gum of any sort; then put the bitumen thus prepared over the fire and leave it so until the essential oil and water contained therein shall be evaporated; then add spirits of wine, or oil of turpentine, or others of the same nature until the whole be of proper thickness for use. Sealing-wax of great beauty can be obtained by following this the fifth formula, saving the addition of spirits of wine and essential oil, which must be omitted. This product, mixed with saw or marble dust or sand, or with the filings or oxides of metals, &c., will answer to make walls, statues, vases, terraces, &c.

In all cases in which it is desired to give this product more or less flexibility there may be added, besides resin and resinous gum, wax, and especially sulphur, from one to thirty per cent.

From the essential oil produced by the distillation of bitumen there is obtained a naphthaline in greater quantity and of much purer quality than by the distillation of tar or pitch.

What I claim as my invention, and desire to secure by Letters Patent, is—

The combination of the materials prepared as per Formula No. 1, named in the foregoing specification, and other known substances of the same nature with the various ingredients therein referred to, or other known substances of the same character, according to the different formulas there set forth.

Havre, June 2, 1843.

E. DEUTSCH. [L. S.]

Witnesses:
  L. BREOVOINE,
  POND SAYLOR.